United States Patent
Dominiak et al.

(10) Patent No.: US 9,109,810 B2
(45) Date of Patent: Aug. 18, 2015

(54) SYSTEM AND METHOD FOR VENTILATING A TURBINE

(75) Inventors: Pascal Dominiak, Hericourt (FR); Joel Coudrieeau, Lege (FR); Philippe Carles, Saint Herblain (FR)

(73) Assignee: GE Energy Products France SNC, Bedfort (FR)

( * ) Notice: Subject to any disclaimer, the term of this patent is extended or adjusted under 35 U.S.C. 154(b) by 988 days.

(21) Appl. No.: 13/013,172

(22) Filed: Jan. 25, 2011

(65) Prior Publication Data

US 2011/0277484 A1    Nov. 17, 2011

(30) Foreign Application Priority Data

Jan. 26, 2010   (FR) ..................................... 10 50505

(51) Int. Cl.
| | |
|---|---|
| *F02K 3/075* | (2006.01) |
| *F02C 6/08* | (2006.01) |
| *F24F 11/047* | (2006.01) |
| *F01D 25/12* | (2006.01) |
| *F02C 7/18* | (2006.01) |
| *F16K 15/03* | (2006.01) |
| *F24F 13/14* | (2006.01) |

(52) U.S. Cl.
CPC .............. *F24F 11/047* (2013.01); *F01D 25/12* (2013.01); *F02C 6/08* (2013.01); *F02C 7/18* (2013.01); *F02K 3/075* (2013.01); *F16K 15/03* (2013.01); *F24F 13/14* (2013.01)

(58) Field of Classification Search
CPC .............. F02C 6/08; F02C 9/18; F02K 3/075
USPC ................................ 60/782, 785, 226.3, 39.1
See application file for complete search history.

(56) References Cited

U.S. PATENT DOCUMENTS

| | | | |
|---|---|---|---|
| 4,094,336 A | 6/1978 | Urschel et al. | |
| 5,113,649 A * | 5/1992 | Siedlecki, Jr. | ............... 60/226.3 |
| 5,184,461 A * | 2/1993 | Stransky et al. | ............. 60/226.3 |
| 2004/0076544 A1* | 4/2004 | Dao | ............................... 422/62 |
| 2008/0028764 A1* | 2/2008 | Cadieux | ......................... 60/772 |

FOREIGN PATENT DOCUMENTS

| | | |
|---|---|---|
| DE | 20312660 U1 | 10/2003 |
| GB | 485850 A | 5/1938 |
| GB | 2073404 A | 10/1981 |
| WO | 2004055338 A1 | 7/2004 |

OTHER PUBLICATIONS

EPO Form 1503, EP, Sep. 21, 2010, Prelim. Ser.Rpt issued in FR appln. 10 50505.

* cited by examiner

*Primary Examiner* — Andrew Nguyen
(74) *Attorney, Agent, or Firm* — Mintz Levin Cohn Ferris Glovsky and Popeo, P.C.; Steven M. Jensen

(57) ABSTRACT

This ventilation system (1), notably for a gas turbine, comprises at least one fan (2) opening into an air extraction duct (5).
It comprises at least one device (6) for varying the pressure drop in the air extraction duct (5), comprising a means (8) of regulating the air flow rate in the air extraction duct (5).

10 Claims, 1 Drawing Sheet

SYSTEM AND METHOD FOR VENTILATING A TURBINE

BACKGROUND OF THE INVENTION (a) Field of the Invention

The invention relates to ventilation systems for turbines.

More specifically, the invention relates to a ventilation system capable of adapting to suit different air extraction flow rates.

One particularly beneficial application of the invention relates to a ventilation system for a gas turbine.

(B) Description of the Related Art

Gas turbines, particularly industrial turbines developing powers of between 40 and 130 megawatts, generally use ventilation systems in order to avoid thermal deformation in the spool or stator of the turbine.

A ventilation system generally comprises at least one motor-driven fan and air inlet and extraction ducts connected to the turbine compartment. It also comprises a device for attenuating nuisance noise acting on the ventilation air inlet and extraction ducts.

As environmental standards and European directives are becoming increasingly tight, ventilation systems operating in an "explosive atmosphere" are subject to very strict regulations, dictating the design of such ventilation systems.

What is meant by an "explosive atmosphere" is an atmosphere that could become explosive as a result of local conditions (the presence of air, fuel, and a source of heat or a spark). This is a mixture of air with flammable substances in the form of gas, vapour or dust, in which, following ignition, combustion spreads throughout the mixture of unburnt gases.

In order to comply with all these standards and directives, the ventilation system needs either to prevent an explosive atmosphere from forming or, where this is not possible, prevent an explosive atmosphere from igniting and lessen the detrimental effects of an explosion.

In order to do that, a ventilation system has to continuously renew the air in the ventilated compartment, dilute any leaks of gas that may occur, and ensure that nuisance noise is kept to a minimum.

Moreover, leaks of gas in air extraction ducts may be due to potential leaks in the flanges of the pipework resulting from vibrations caused by the turbine or from thermal expansions due to excessive temperatures within the turbine.

When the compartment does exhibit potential leaks of gas, there are a number of devices that propose creating a reduced pressure in this compartment. Thus, the gases at high pressure are sucked out by the air at a lower pressure.

In order to comply with environmental standards, the ventilation systems have become increasingly complex, through the addition of several motor driven fan units, providing redundancy, the disadvantage here being the increase in the size and weight of such systems and making on-site assembly and maintenance more difficult.

The prior art has already attempted to achieve these objectives. Documents US 2004/0231418, JP 59015636 and US 2007/249279 in this regard propose solutions capable of achieving these objectives.

However, particular reference may be made to document US 2001/0003242 which proposes a ventilation system made up of fans and of ducts arranged vertically in the rear part of the turbine compartment.

This then reduces the size of the system and makes on-site assembly and maintenance easier.

Most conventional ventilation systems use non-return valves situated in the ducts, of round or square section. These valves are unable to seal the system completely and the frequent sticking of these valve shutters leads to air leaking between the fans, thus altering the flow and the profile of the ventilation. These shortcomings are due to the mechanical stresses applied on closing and opening these valves and to the vibrations caused by the passage of air through the valves in the air extraction duct.

Moreover, one gas turbine requires an air flow rate of 15 $m^3/s$ and an air flow axial to the turbine, whereas another device may require an air extraction flow rate of 2 $m^3/s$ with the air flow vertical to the device.

The solutions proposed in the prior art are unable to offer a ventilation system capable of adapting to suit different air extraction flow rates.

SUMMARY OF THE INVENTION

It is therefore an object of the invention to alleviate the disadvantages associated with the use of such ventilation systems and to provide a ventilation system and method which is simplified and capable of adapting to suit different air extraction flow rates, of preserving the quiet operation of the ventilation system while at the same time complying with the environmental standards and European directives.

The subject of the invention is therefore a ventilation system, notably for a gas turbine, comprising at least one fan opening into an air extraction duct.

This system comprises at least one device for varying the pressure drop in the air extraction duct, comprising a means of regulating the air flow rate in the air extraction duct.

By virtue of the presence, within the ventilation system, of the pressure drop device and of the means of regulating the air flow rate in the extraction duct, it is possible to regulate the air flow rate in the extraction duct according to the air flow delivered by the fan. In particular, it has been found that in this way it was possible to keep the air flow rate in the extraction duct constant, varying by 10% at most.

According to another feature of this ventilation system, the device for varying the pressure drop comprises a means for regulating the direction of the air flow through the extraction duct so as to have optimum distribution of the air at the entrance to the silencers.

For example, the means of regulating the air flow rate comprises a flap pivot mounted on a casing mounted on the wall of the duct. Such a flap thus constitutes a valve shutter which then no longer merely creates a pressure drop but also forms a bend of variable angle in the duct thus providing a way of adapting to suit the operation and demands of the ventilation system.

According to yet another feature, the system comprises a member for balancing the flap, for example a counterweight.

In one embodiment, the flap has a convex shape, the convex side facing towards the inside of the duct.

The means of regulating the direction of the air flow may further comprise an end stop for adjusting the degree to which the flap can open.

Advantageously, this end stop is accessible from outside the duct. It is thus possible easily to regulate the maximum angle through which the flap can open either manually or using an automatic member, the movement of which is linear or rotary.

According to yet another feature, the device for varying the pressure drop in the air extraction duct comprises a non-ferrous contact.

BRIEF DESCRIPTION OF THE DRAWINGS

Further objects, features and advantages of the invention will become apparent from reading the following description, given solely by way of unlimiting example, and made with reference to the accompanying drawings in which.

DETAILED DESCRIPTION OF THE INVENTION

Figure 1:
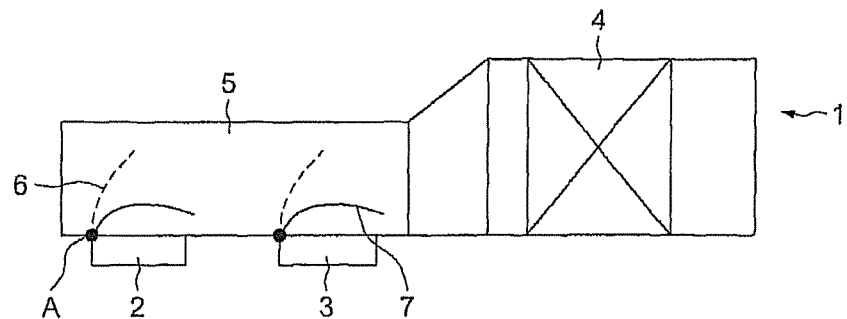
FIG. 1 schematically illustrates the structure of a ventilation system according to the invention.

FIG. 1 schematically depicts a ventilation system 1 for a gas turbine.

Such a system is intended to provide ventilation for stationary parts of the turbine such as the spool or the stator of the turbine and for this purpose is intended to be connected in contact with the turbine.

It essentially comprises an air extraction duct 5 provided with a noise attenuating device 4, in this particular instance a silencer, and a set of fans 2 and 3, in this instance two of them, intended to inject air into the extraction duct 5.

The duct 5 is fitted to the compartment of the turbine that is to be ventilated and is thus used for renewing the air in the compartment, diluting and detecting any potential leaks of gas, and attenuating the nuisance noise generated by the extraction air flow along the duct 5.

With a view to regulating the extraction air flow rate, the system 1 is further provided with devices 6 and 7 for varying the pressure drop, which devices are positioned in the path of the extraction air flow.

These devices are each associated with a fan 2, 3 and are also placed in the path of the air injected by the fans into the duct.

The fans 2 and 3 each operate in turn but if the temperature in the compartment is high or the air flow rate is too low, the two fans can operate simultaneously, so as to regulate the air flow rate in the air extraction duct 5 as quickly as possible.

The device 6 for varying the pressure drop is associated with the fan 2 and the device 7 is associated with the fan 3.

Dotted line has been used to depict the open position of the devices 6 and 7 that vary the pressure drop and solid line has been used to depict these devices 6 and 7 in the closed position.

The ventilation system thus and nonlimitingly comprises two fans and two pressure drop devices. In actual fact, it could comprise just one, or conversely, could comprise more than two.

Figure 2:
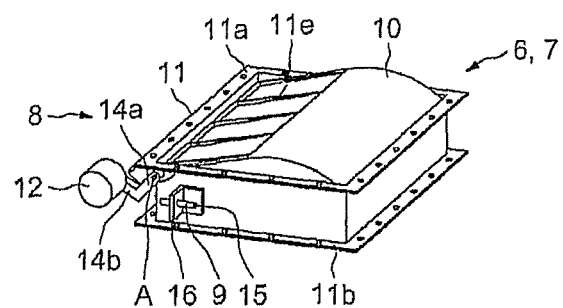
FIG. 2 depicts a device for varying the pressure drop in the air extraction duct according to the invention, in the closed position.
Figure 3:
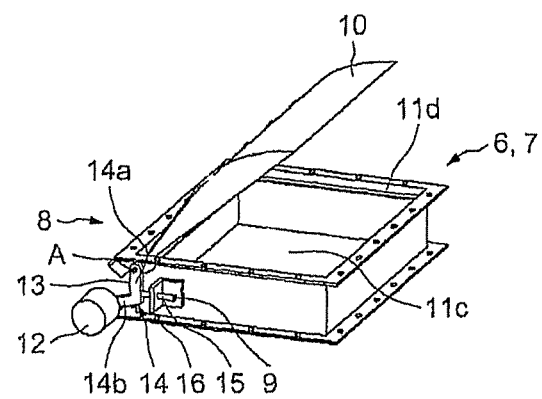
FIG. 3 depicts a device for varying the pressure drop in the air extraction duct according to the invention, in the open position.

FIGS. 2 and 3 depict a device 6 or 7 for varying the pressure drop in the air extraction duct 5 in the closed position and in the open position, respectively. As may be seen, the varying device 6 is analogous to a valve and comprises a means 8 of regulating the air flow rate and a means 9 of regulating the direction of the air flow in the air extraction duct 5. This entity is mounted on a casing 11 which is attached to the fan outlet.

More specifically, the casing 11 is of parallelepipedal overall shape with a square base and comprises two end plates 11a and 11b for attaching it to two mutually opposing faces of the duct 5, in the region at which the corresponding fan 2, 3 is attached.

Internally it delimits a passage 11c through which the air flow delivered by the fan is injected into the duct 5.

As far as the means 8 for regulating the air flow rate is concerned, this essentially comprises a flap 10 mounted by a pivot connection onto the casing 11 so as to be pivot mounted about an axis A running transversely when considering the air flow along the duct 5.

The flap 10 assumes a convex configuration, with the convex side facing towards the inside of the duct 5 and is provided with axial ribs 11e.

The flap 10 is thus pivot mounted with respect to the casing 11 so that it can pivot between a closed position visible in FIG. 2, in which it rests against a seat 11d made in the casing 11, at the same level as the axis A, and an open position visible in FIG. 3.

As may be seen in FIGS. 2 and 3, the axis A is situated immediately below the end plate 11a via which the casing 11 is mounted on the internal surface of the duct 5.

Moreover, the axis A is extended, at one of its ends, by an arm 14 comprising a first branch 14a mounted on the axle A and a branch 14b extending in the continuation of the arm 14a and on which a counterweight 12 is mounted.

Thanks to this arrangement, when the flap 10 is in the closed position, the counterweight 12 extends substantially in the plane of the flap and applies a balancing force that counters the weight of the flap 10.

Thus, through a suitable choice of counterweight 12, it is possible to balance the flap 10 so that it opens under the effect of the air flow delivered by the fans and adopts a position of equilibrium under the action of the forces of the flap, of the counterweight 12 and of the loads applied to the flap by the air flow from the fan and the flow of extraction air.

However, it will be noted that the means 9 for regulating the direction of the air flow here comprises an end stop for regulating the degree of opening of the flap 10, this end stop being produced in the form of a rod 15 mounted on a radial support 16 extending laterally from the external peripheral surface of the casing 11 so that the free end of the rod 15 constitutes an end stop against which the branch 14a of the arm 14 rests when the flap 10 is in the open position.

Thus, by virtue of this arrangement, when one or other of the fans 2 or 3 is actuated, the flap 10 of the device 6 or 7 opens under the effect of the air flow delivered by the fan and adopts a position of equilibrium in the duct 5 under the combined action of the extracted air flow flowing along the duct and the air flow delivered by the fan and in such a way as to create, in the duct 5, a narrowing of the bore section thus creating a pressure drop which thereby limits the flow rate making it possible in this way to obtain a flow rate that remains substantially constant irrespective of the options and chosen configuration.

Specifically, even when the fans are in operation, thanks to the pressure drop created in the duct 5, the rate at which air is extracted by the duct 5 is kept constant so that the noise levels and acoustics are not adversely affected. Further, thanks to the convex shape of the flap 10, the air flow remains guided along the duct 5, thus limiting turbulence.

It will be noted that the device that has just been described is particularly well suited to operating at flow rates of below 2 m$^3$/s.

Finally, it will be noted that, with a view to complying with environmental standards and European regulations, the device 6 for varying the pressure drop in the air extraction duct 5 comprises a non-ferrous contact. This then reduces the risk of explosions in the presence of a potentially explosive atmosphere.

Thanks to the ventilation system and method that has just been described, the device for varying the pressure drop is able simultaneously to regulate the air flow rate and the direction of the air flow through the air extraction duct while at the same time providing the system with good sealing and ensuring the mechanical robustness of the valves.

It will also be noted that such a system is able to reduce the size, facilitate on-site assembly and comply with European standards and regulations.

It will moreover be noted that, in the exemplary embodiment described hereinabove, the flap 10 is provided with a balancing counterweight. Of course it would be possible, as an alternative, for the counterweight to be replaced by any other appropriate device such as a spring. The use of a counterweight or of a spring in any event allows ease of adjustment of the force required to move the flap. Further, the use of an adjustable end stop, accessible from the outside of the duct, allows to easily adjust the wide-open position of the flap.

The invention claimed is:

1. A ventilation system for a gas turbine, comprising:
 at least one fan opening into an air extraction duct, the at least one fan configured to inject air into the air extraction duct;
 at least one device for varying a pressure drop in the air extraction duct, the at least one device being placed in a path of both an extraction air flow in the air extraction duct and the air injected by the at least one fan into the air extraction duct, the at least one device comprising a casing directly coupled to the air extraction duct, wherein the at least one fan is coupled directly to the casing; and
 a means for regulating an air flow rate in the air extraction duct,
 the at least one device adopting an equilibrium position under combined action of the extracted extraction air flow flowing along the air extraction duct and the air flow delivered by the at least one fan.

2. The ventilation according to claim 1, wherein the at least one device for varying the pressure drop comprises a means for regulating a direction of the air flow through the air extraction duct.

3. The ventilation system according to one of claims 1 and 2, wherein the means for regulating the air flow rate comprises a flap pivotally mounted on a casing, which is mounted on a wall of the air extraction duct.

4. The ventilation system according to claim 3, further comprising a member for balancing the flap.

5. The ventilation system according to claim 4, wherein the balancing member is a counterweight.

6. The ventilation system according to claim 3, wherein the flap has a convex shape, the convex side facing towards the inside of the duct.

7. The ventilation system according to claim 1, wherein the at least one device for varying the pressure drop is a valve shutter.

8. The ventilation system according to claim 2, wherein the means for regulating the direction of the air flow comprises an end stop for adjusting a degree to which the flap can open.

9. The ventilation system according to claim 8, wherein the end stop is accessible from outside the duct.

10. The ventilation system according to claim 1, wherein the at least one device for varying the pressure drop in the air extraction duct comprises a non-ferrous contact.

\* \* \* \* \*